US012383886B2

(12) United States Patent
Takada et al.

(10) Patent No.: US 12,383,886 B2
(45) Date of Patent: Aug. 12, 2025

(54) MONOLITHIC ORGANIC POROUS ION EXCHANGER

(71) Applicant: ORGANO CORPORATION, Tokyo (JP)

(72) Inventors: Hitoshi Takada, Tokyo (JP); Ryouta Iwaura, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 766 days.

(21) Appl. No.: 17/622,399

(22) PCT Filed: Jun. 5, 2020

(86) PCT No.: PCT/JP2020/022238
§ 371 (c)(1),
(2) Date: Dec. 23, 2021

(87) PCT Pub. No.: WO2020/261929
PCT Pub. Date: Dec. 30, 2020

(65) Prior Publication Data
US 2022/0331776 A1 Oct. 20, 2022

(30) Foreign Application Priority Data
Jun. 28, 2019 (JP) .................................. 2019-121516

(51) Int. Cl.
B01J 20/28 (2006.01)
B01J 20/26 (2006.01)
(Continued)

(52) U.S. Cl.
CPC ....... B01J 20/28045 (2013.01); B01J 20/267 (2013.01); B01J 20/28073 (2013.01);
(Continued)

(58) Field of Classification Search
None
See application file for complete search history.

(56) References Cited

U.S. PATENT DOCUMENTS 2,597,437 A * 5/1952 Bodamer ................. B01J 39/20
526/329
9,346,895 B2 * 5/2016 Inoue ........................ C08F 2/32
2019/0300464 A1 10/2019 Takada et al.

FOREIGN PATENT DOCUMENTS

JP 2003-246809 9/2003
JP 2014-15420 1/2014
(Continued)

OTHER PUBLICATIONS

Official Communication issued in International Patent Application No. PCT/JP2020/022238, dated Aug. 4, 2020, along with an English translation thereof.
(Continued)

Primary Examiner — Fred M Teskin
(74) Attorney, Agent, or Firm — GREENBLUM & BERNSTEIN, P.L.C.

(57) ABSTRACT

A monolithic organic porous ion exchanger having a continuous skeleton and continuous pores, wherein the continuous skeleton is formed of an organic polymer being a hydrolysate of a crosslinked polymer of a (meth)acrylic acid ester and divinylbenzene, the organic polymer having any one or both of a —COOH group and a —COONa group as ion-exchange groups, the continuous skeleton has a thickness of 0.1 to 100 μm, the continuous pores have an average diameter of 1.0 to 1000 μm, the monolithic organic porous ion exchanger has a total pore volume of 0.5 to 50.0 mL/g, and has a total ion-exchange capacity of the —COOH group and the —COONa group per weight in a dry state of 4.0 mg equivalent/g or more.

2 Claims, 3 Drawing Sheets

(51) Int. Cl.
  *B01J 39/20*   (2006.01)
  *C08J 5/22*   (2006.01)

(52) U.S. Cl.
  CPC ... *B01J 20/28076* (2013.01); *B01J 20/28085* (2013.01); *B01J 39/20* (2013.01); *C08J 5/22* (2013.01)

(56) References Cited

FOREIGN PATENT DOCUMENTS

| | | |
|---|---|---|
| JP | 2017-119233 | 7/2017 |
| TW | 201736328 A | 10/2017 |

OTHER PUBLICATIONS

Office Action date stamped Feb. 2, 2024 in Taiwanese family member application No. 109119775, with English language translation thereof.

\* cited by examiner

MONOLITHIC ORGANIC POROUS ION EXCHANGER

TECHNICAL FIELD

The present invention relates to a monolithic organic porous ion exchanger having excellent absorbency to a liquid to be absorbed, such as water, an aqueous solution, or a hydrophilic organic solvent.

BACKGROUND ART

A high-concentration aqueous acid solution such as high-concentration hydrochloric acid (for example, 35% concentration HCl water), an alkaline aqueous solution such as high-concentration ammonia water (for example, 29% concentration ammonia water), or the like, which is used in a chemical plant, is usually produced in another plant and transported by tanker or the like. In addition, even in the case of a low-concentration aqueous sodium hydroxide solution (for example, 4% concentration aqueous NaOH solution) or a low-concentration hydrochloric acid (for example, 4% concentration HCl water), if a concentration-adjusting container is not installed, an aqueous solution the concentration of which is adjusted to a desired concentration is produced in another plant and transported by tanker or the like.

If the tanker encounters a traffic accident during this transportation by tanker and the tanker loaded with high-concentration hydrochloric acid or the like turns over and lies on its side, there is a risk that an accident that the loaded hydrochloric acid flows out on a road and the land surrounding the road is brought about. High-concentration hydrochloric acid or the like is a toxic substance and therefore needs to be collected quickly if an outflow accident occurs. For this reason, absorbent materials capable of absorbing these outflows quickly have been desired.

Patent Literature 1 discloses an organic porous ion exchanger having an open-cell structure that includes macropores communicating with one another and mesopores having a radius of 0.01 to 100 μm in walls of the macropores, the organic porous ion exchanger having a total pore volume of 1 to 50 ml/g, having a value obtained by dividing a half-value width in a main peak of a pore distribution curve by a radius at the main peak of 0.5 or less, and containing an ion-exchange group.

CITATION LIST

Patent Literature

[Patent Literature 1]
Japanese Patent Laid-Open No. 2003-246809

SUMMARY OF INVENTION

Technical Problem

However, Patent Literature 1 mentions the adsorptivity of the organic porous ion exchanger to a solute but does not mention the absorbency to the whole solution. In the first place, the organic porous ion exchanger of Patent Literature 1 is used in a state where water has been absorbed, and therefore there has not been a concept of absorbency to a solution in Patent Literature 1.

Accordingly, an object of the present invention is to provide a monolithic organic porous ion exchanger having excellent absorbency to a liquid to be absorbed, such as water, an aqueous solution, or a hydrophilic organic solvent.

Solution to Problem

The problem is solved by the present invention described below.

That is, the present invention (1) provides a monolithic organic porous ion exchanger comprising: a continuous skeleton; and continuous pores, wherein
the continuous skeleton is formed of an organic polymer being a hydrolysate of a crosslinked polymer of a (meth)acrylic acid ester and divinylbenzene, the organic polymer having any one or both of a —COOH group and a —COONa group as ion-exchange groups, the continuous skeleton has a thickness of 0.1 to 100 μm, the continuous pores have an average diameter of 1.0 to 1000 μm, the monolithic organic porous ion exchanger has a total pore volume of 0.5 to 50.0 mL/g, and
the monolithic organic porous ion exchanger has a total ion-exchange capacity of the —COOH group and the —COONa group per weight in a dry state of 4.0 mg equivalent/g or more.

The present invention (2) provides the monolithic organic porous ion exchanger according to (1), wherein the monolithic organic porous ion exchanger has an open-cell structure in which bubble-like macropores overlap and overlapping parts form openings having an average diameter of 1.0 to 1000 μm, and has a total pore volume of 1.0 to 50.0 mL/g.

Advantageous Effect of Invention

According to the present invention, a monolithic organic porous ion exchanger having excellent absorbency to a liquid to be absorbed, such as water, an aqueous solution, or a hydrophilic organic solvent, can be provided.

DESCRIPTION OF EMBODIMENTS

Figure 1:
FIG. 1 is a SEM photograph of a monolithic organic porous material of Example 1.

The monolithic organic porous ion exchanger of the present invention is a monolithic organic porous ion exchanger comprising: a continuous skeleton; and continuous pores, wherein
the continuous skeleton is formed of an organic polymer being a hydrolysate of a crosslinked polymer of a (meth)acrylic acid ester and divinylbenzene, the organic polymer having any one or both of a —COOH group and a —COONa group as ion-exchange groups, the continuous skeleton has a thickness of 0.1 to 100 μm, the continuous pores have an average diameter of 1.0 to 1000 μm, the monolithic organic porous ion exchanger has a total pore volume of 0.5 to 50.0 mL/g, and the monolithic organic porous ion exchanger has a total ion-exchange capacity of the —COOH group and the —COONa group per weight in a dry state of 4.0 mg equivalent/g or more. Note that a (meth)acrylic acid ester in the present invention means an acrylic acid ester and/or a methacrylic acid ester.

The monolithic organic porous ion exchanger of the present invention is a porous material in which either a —COOH group or a —COONa group, or both of a —COOH group and a —COONa group are introduced in a monolithic organic porous material. The monolithic organic porous material pertaining to the monolithic organic porous ion exchanger is a porous material in which the continuous skeleton is formed of an organic polymer, the porous material having, in the gaps of the continuous skeleton, a large number of communication pores which are the sites where a liquid to be absorbed is absorbed. The monolithic organic porous ion exchanger is a porous material in which either the —COOH group or the —COONa group, or both of the —COOH group and the —COONa group are introduced in the skeleton of this monolithic organic porous material in such a way as to be distributed uniformly.

Note that the "monolithic organic porous material" in the present specification refers to an organic porous material comprising a crosslinked polymer of a (meth)acrylic acid ester and divinylbenzene before a hydrolysis treatment is performed on the crosslinked polymer, and the "monolithic organic porous material" is also simply referred as a "monolith." The "monolithic organic porous ion exchanger" refers to a hydrolysate of a crosslinked polymer of a (meth)acrylic acid ester and divinylbenzene after a hydrolysis treatment is performed on the crosslinked polymer, and the "monolithic organic porous ion exchanger" is also simply referred to as a "monolith ion exchanger."

The structure of the monolithic organic porous ion exchanger of the present invention will be described. The monolithic organic porous ion exchanger of the present invention comprises a continuous skeleton and continuous pores, wherein the continuous skeleton has a thickness of 0.1 to 100 μm, the continuous pores have an average diameter of 1.0 to 1000 μm, and the monolithic organic porous ion exchanger has a total pore volume of 0.5 to 50.0 mL/g. Note that with respect to a sample for measuring the thickness of the continuous skeleton, the average diameter of the continuous pores, and the total pore volume, the ion exchanger dried at 50° C. for 18 hours or longer by a decompression drier irrespective of the ion types of the ion exchanger is used as the sample (in a dry state). The ultimate pressure is set to 0 TORR.

The thickness of the continuous skeleton of the monolithic organic porous ion exchanger of the present invention in a dry state is 1.0 to 100 μm. When the thickness of the continuous skeleton of the monolith ion exchanger is less than 0.1 μm, the strength of the ion exchanger is lowered, and when the thickness of the monolith ion exchanger exceeds 100 μm, the absorption of a liquid is slow. Note that in the measurement of the thickness of the continuous skeleton of the monolithic organic porous ion exchanger of the present invention in a dry state, the pore structure of the monolithic organic porous ion exchanger is an open-cell structure, and therefore a section of the skeleton, which appears in a test piece for electron microscopic measurement, is defined as a part where the thickness is evaluated. The skeleton is formed by gaps among water droplets and therefore often takes a form of a polygon. The thickness of the skeleton is defined as the average value of diameters of circles circumscribing the polygonal sections. There may be a small hole in a polygon in rare cases, but in such cases, a circumscribing circle of the polygonal section surrounding the small hole may be adopted.

The average diameter of the continuous pores of the monolithic organic porous ion exchanger of the present invention in a dry state is 1.0 to 1000 μm. When the average diameter of the continuous pores of the monolith ion exchanger is less than 1 μm, the speed of absorbing the liquid to be absorbed is lowered, and when the average diameter of the continuous pores of the monolith ion exchanger exceeds 100 μm, the strength of the ion exchanger is lowered. Note that the average diameter of the continuous pores of the monolith ion exchanger in a dry state is measured by mercury porosimetry and refers to a maximum value of a pore distribution curve obtained by mercury porosimetry.

The total pore volume of the monolithic organic porous ion exchanger of the present invention in a dry state is 0.5 to 50.0 mL/g. When the total pore volume of the monolith ion exchanger is less than 0.5 ml/g, the absorption of the liquid to be absorbed and the water absorption speed are lowered, and when the total pore volume of the monolith ion exchanger exceeds 50.0 ml/g, the strength of the ion exchanger is lowered. Note that the total pore volume is measured by mercury porosimetry. With respect to a sample for measuring the total pore volume, the ion exchanger dried at 50° C. for 18 hours or longer by a decompression drier is used as the sample irrespective of ion types of the ion exchanger. The ultimate pressure is set to 0 TORR.

Examples of the structure of such a monolith ion-exchanger include open-cell structures disclosed in Japanese Patent Laid-Open No. 2002-306976 and Japanese Patent Laid-Open No. 2009-62512, a co-continuous structure disclosed in Japanese Patent Laid-Open No. 2009-67982, a particle-aggregated structure disclosed in Japanese Patent Laid-Open No. 2009-7550, and a particle composite structure disclosed in Japanese Patent Laid-Open No. 2009-108294.

The continuous skeleton of the monolithic organic porous ion exchanger of the present invention is formed of an organic polymer being a hydrolysate of a crosslinked polymer of a (meth)acrylic acid ester and divinylbenzene, the organic polymer having either a —COOH group or a —COONa group, or both of a —COOH group and a —COONa group as ion-exchange groups.

In the monolithic organic porous ion exchanger of the present invention, the organic polymer that forms the continuous skeleton is obtained by firstly performing crosslinking polymerization using the (meth)acrylic acid ester as a polymerization monomer and divinylbenzene as a crosslinking monomer, and subsequently hydrolyzing the resultant crosslinked polymer. Therefore, the organic polymer that forms the continuous skeleton comprises, as constituent units, a polymerization residue of an ethylene group (hereinafter, also referred to as constituent unit A) and a crosslinking polymerization residue of divinylbenzene (hereinafter, also referred to as constituent unit B). The polymerization residue of the ethylene group (constituent unit A) in the organic polymer that forms the continuous skeleton has any one or both of the —COOH group and the —COONa group produced by hydrolysis of a carboxylic acid ester group. Note that when the polymerization monomer is a methacrylic acid ester, the polymerization residue of the ethylene group (constituent unit A) has: any one or both of the —COOH group and the —COONa group; and a methyl group. In addition, the polymerization residue of the ethylene group (constituent unit A) may have an unhydrolyzed ester group as a part thereof.

In the monolithic organic porous ion exchanger of the present invention, the proportion of the crosslinking polymerization residue of divinylbenzene (constituent unit B) in the organic polymer that forms the continuous skeleton is 0.1 to 30% by mole, and preferably 0.1 to 20% by mole, based on the total amount of the constituent units. When the proportion of the crosslinking polymerization residue of divinylbenzene in the organic polymer that forms the continuous skeleton is less than the above-described range, the strength of the ion exchanger is lowered, and when the proportion exceeds the above-described range, the absorption of the liquid to be absorbed is lowered.

In the monolithic organic porous ion exchanger of the present invention, the proportion of the constituent unit B based on the total number of moles of the constituent unit A and the constituent unit B in the organic polymer that forms the continuous skeleton is preferably 0.1 to 30% by mole, and particularly preferably 0.1 to 20% by mole. When the proportion of the constituent unit B based on the total number of moles of the constituent unit A and the constituent unit B in the organic polymer that forms the continuous skeleton is less than the above-described range, the strength of the ion exchanger is lowered, and when the proportion exceeds the above-described range, the absorption of the liquid to be absorbed is lowered.

In the monolithic organic porous ion exchanger of the present invention, the organic polymer that forms the continuous skeleton may consists of the constituent unit A and the constituent unit B, or may have, in addition to the constituent unit A and the constituent unit B, a constituent unit other than the constituent unit A and the constituent unit B, that is, a polymerization residue of a monomer other than the (meth)acrylic acid ester and divinylbenzene. Examples of the constituent unit other than the constituent unit A and the constituent unit B include polymerization residues of monomers, such as styrene, α-methylstyrene, vinyltoluene, vinylbenzyl chloride, glycidyl (meth)acrylate, 2-ethylhexyl (meth)acrylate, isobutene, butadiene, isoprene, chloroprene, vinyl chloride, vinyl bromide, vinylidene chloride, tetrafluoroethylene, (meth)acrylonitrile, vinyl acetate, ethylene glycol di(meth)acrylate, tripropylene glycol di(meth)acrylate, and trimethylolpropane tri(meth)acrylate. In addition, the proportion of the constituent unit other than the constituent unit A and the constituent unit B in the organic polymer that forms the continuous skeleton is 0 to 80% by mole, and preferably 0 to 50% by mole, based on the total amount of the constituent units.

In the monolithic organic porous ion exchanger of the present invention, the organic polymer that forms the continuous skeleton has any one or both of the —COOH group and the —COONa group as ion-exchange groups. The existence of the —COOH group and the —COONa group in the organic polymer that forms the continuous skeleton is ascertained by performing analysis by infrared spectrophotometry and a method of quantifying a weakly acidic ion-exchange group.

The total ion-exchange capacity of the —COOH group and the —COONa group per weight of the monolithic organic porous ion exchanger of the present invention in a dry state is 4.0 mg equivalent/g or more, preferably 5.0 mg equivalent/g or more, and particularly preferably 6.0 mg equivalent/g or more. When the total ion-exchange capacity of the —COOH group and the —COONa group of the monolith ion exchanger in a dry state is less than the above-described range, the absorption of the liquid to be absorbed is decreased, and the absorption speed is slow. Examples of the upper limit value of the total ion-exchange capacity of the —COOH group and the —COONa group of the monolith ion exchanger in a dry state include, but not particularly limited to, 14.0 mg equivalent/g or less, or 13.0 mg equivalent/g or less.

Note that in the present invention, the total ion-exchange capacity of the —COOH group and the —COONa group refers to: the ion-exchange capacity of the —COOH group when the monolith ion exchanger of the present invention has only the —COOH group of the —COOH group and the —COONa group; the ion-exchange capacity of the —COONa group when the monolith ion exchanger of the present invention has only the —COONa group of the —COOH group and the —COONa group; and the total of the ion-exchange capacities of the —COOH group and the —COONa group when the monolith ion exchanger of the present invention has both of the —COOH group and the —COONa group. In addition, the total ion-exchange capacity of the —COOH group and the —COONa group per weight of the monolith ion exchanger in a dry state is measured by: quantifying the amount of the —COOH group by neutralization titration using a sample obtained by converting all the ion-exchange groups of the monolith ion exchanger into the —COOH group using a sufficient amount of an acid; and determining the dry weight value of the monolith ion exchanger by collecting the whole amount of the monolith ion exchanger used when the amount of the —COOH group is quantified.

The ion-exchange groups introduced in the monolith ion exchanger are distributed uniformly not only on the surface of the monolith but also inside the skeleton of the monolith. That "the ion-exchange groups are distributed uniformly" here refers to that the ion-exchange groups are distributed uniformly on the surface and inside the skeleton at least in the order of μm. The status of the distribution of the ion-exchange groups is ascertained easily by using EPMA.

In the monolithic organic porous ion exchanger of the present invention, the (meth)acrylic acid ester of the raw materials for polymerization for the organic polymer that forms the continuous skeleton is not particularly limited but is preferably a C1 to C10 alkyl ester of (meth)acrylic acid, and particularly preferably a C4 alkyl ester of (meth)acrylic acid. Examples of the C4 alkyl ester of (meth)acrylic acid include a (meth)acrylic acid t-butyl ester, a (meth)acrylic acid n-butyl ester, and a (meth)acrylic acid iso-butyl ester.

<Examples of Embodiments of Monolithic Organic Porous Ion Exchanger>

Examples of the monolithic organic porous ion exchanger of the present invention include the first monolith ion exchanger described below.

<Description of First Monolith Ion Exchanger>

The first monolith ion exchanger is the monolithic organic porous ion exchanger comprising the continuous skeleton and the continuous pores, wherein the continuous skeleton is formed of the organic polymer being the hydrolysate of the crosslinked polymer of the (meth)acrylic acid ester and divinylbenzene, the organic polymer having any one or both of the —COOH group and the —COONa group as ion-exchange groups, the monolithic organic porous ion exchanger has an open-cell structure in which bubble-like macropores overlap and overlapping parts form openings having an average diameter of 1.0 to 1000 μm, the continuous skeleton has a thickness of 0.1 to 100 μm, the continuous pores have an average diameter of 1.0 to 1000 μm, the monolithic organic porous ion exchanger has a total pore volume of 1.0 to 50.0 mL/g, and the monolithic organic porous ion exchanger has a total ion-exchange capacity of the —COOH group and the —COONa group per weight in a dry state of 4.0 mg equivalent/g or more.

The first monolith ion exchanger is an open-cell structural body (continuous macropore structural body) in which bubble-like macropores overlap and overlapping parts form common openings (mesopores) having an average diameter of 1.0 to 1000 μm, preferably 10.0 to 200 μm, and particularly preferably 20.0 to 100 μm, in a dry state, and the open-cell structural body is of an open-pore structure for the most part. The number of overlaps between macropores is 1 to 12 for one macropore, and 3 to 10 for most macropores. FIG. 1 shows a scanning electron micrograph (SEM) photograph as an example of the embodiments of the first monolith ion exchanger, and the first monolith ion exchanger shown in FIG. 1 is an open-cell structural body which has a large number of bubble-like macropores and is an open-cell structural body in which the bubble-like macropores overlap and overlapping parts form common openings (mesopores), and the open-cell structural body has an open-pore structure for the most part. When the average diameter of the mesopores in a dry state is less than the above-described range, the speed of absorbing the liquid to be absorbed is too slow, and when the average diameter of the mesopores in a dry state exceeds the above-described range, the monolith ion exchanger is fragile. When the structure of the first monolith ion exchanger is an open-cell structure as described above, the macropore group and the mesopore group can thereby be formed uniformly, and the pore volume and the specific surface area can remarkably be made larger than the particle-aggregated porous material as described in Japanese Patent Laid-Open No. 8-252579 and the like.

Note that in the present invention, the average diameter of the openings of the first monolith ion exchanger in a dry state is measured by mercury porosimetry and refers to a maximum value of a pore distribution curve obtained by mercury porosimetry.

The total pore volume per weight of the first monolith ion exchanger in a dry state is 1.0 to 50.0 ml/g, and preferably 2.0 to 30.0 ml/g. When the total pore volume is less than the above-described range, the absorption of the liquid to be absorbed is too small, and when the total pore volume exceeds the above-described range, the strength of the ion exchanger is lowered.

The continuous skeleton of the first monolith ion exchanger is formed of the organic polymer being the hydrolysate of the crosslinked polymer (meth)acrylic acid ester and divinylbenzene, the organic polymer having any one or both of the —COOH group and the —COONa group as ion-exchange groups.

The organic polymer that forms the continuous skeleton of the first monolith ion exchanger is obtained by firstly performing crosslinking polymerization using the (meth) acrylic acid ester as a polymerization monomer and divinylbenzene as a crosslinking monomer, and subsequently hydrolyzing the resultant crosslinked polymer. Therefore, the organic polymer that forms the continuous skeleton comprises, as constituent units, the polymerization residue of the ethylene group (constituent unit A) and the crosslinking polymerization residue of divinylbenzene (constituent unit B). The polymerization residue of the ethylene group (constituent unit A) in the organic polymer that forms the continuous skeleton has any one or both of the —COOH group and the —COONa group produced by hydrolysis of the carboxylic acid ester group. Note that when the polymerization monomer is a methacrylic acid ester, the polymerization residue of the ethylene group (constituent unit A) has: any one or both of the —COOH group and the —COONa group; and a methyl group. In addition, the polymerization residue of the ethylene group (constituent unit A) may have an unhydrolyzed ester group as a part thereof.

The proportion of the crosslinking polymerization residue of divinylbenzene (constituent unit B) in the organic polymer that forms the continuous skeleton of the first monolith ion exchanger is 0.1 to 10% by mole, and preferably 0.3 to 8% by mole, based on the total amount of the constituent units. When the proportion of crosslinking polymerization residue of divinylbenzene in the organic polymer that forms a continuous skeleton phase is less than the above-described range, (the physical strength is lowered and therefore handling is difficult, and when the proportion exceeds the above-described range, the first monolith ion exchanger is made hard, so that absorption is decreased.

In the first monolith ion exchanger, the proportion of the constituent unit B based on the total number of moles of the constituent unit A and the constituent unit B in the organic polymer that forms the continuous skeleton is preferably 0.1 to 10% by mole, and particularly preferably 0.3 to 8% by mole. When the proportion of the constituent unit B based on the total number of moles of the constituent unit A and the constituent unit B in the organic polymer that forms the continuous skeleton is less than the above-described range, the physical strength is lowered and therefore handling is made difficult, and when the proportion exceeds the above-described range, absorption is decreased.

In the first monolith ion exchanger, the organic polymer that forms the continuous skeleton may consist of the constituent unit A and the constituent unit B, or may have, in addition to the constituent unit A and the constituent unit B, a constituent unit other than the constituent unit A and the constituent unit B, that is, a polymerization residue of a monomer other than the (meth)acrylic acid ester and divinylbenzene. Examples of the constituent unit other than the constituent unit A and the constituent unit B include polymerization residues of monomers, such as styrene, α-methylstyrene, vinyltoluene, vinylbenzyl chloride, glycidyl (meth) acrylate, 2-ethylhexyl (meth)acrylate, isobutene, butadiene, isoprene, chloroprene, vinyl chloride, vinyl bromide, vinylidene chloride, tetrafluoroethylene, (meth)acrylonitrile, vinyl acetate, ethylene glycol di(meth)acrylate, tripropylene glycol di(meth)acrylate, and trimethylolpropane tri(meth) acrylate. In addition, the proportion of the constituent unit other than the constituent unit A and the constituent unit B in the organic polymer that forms the continuous skeleton is 0 to 80% by mole, and preferably 0 to 50%, based on the total amount of the constituent units.

In the first monolith ion exchanger, the organic polymer that forms the continuous skeleton has any one or both of the —COOH group and the —COONa group as ion-exchange groups. The total ion-exchange capacity of the —COOH group and the —COONa group per weight of the first monolith ion exchanger in a dry state is 4.0 mg equivalent/g or more, preferably 5.0 mg equivalent/g or more, and particularly preferably 6.0 mg equivalent/g or more. When the total ion-exchange capacity of the —COOH group and the —COONa group of the monolith ion exchanger in a dry state is less than the above-described range, the absorption of the liquid to be absorbed and the speed of absorbing the liquid to be absorbed are lowered. Examples of the upper limit value of the total ion-exchange capacity of the —COOH group and the —COONa group of the monolith ion exchanger in a dry state include, but not particularly limited to, 14.0 mg equivalent/g or less, or 13.0 mg equivalent/g or less.

<Method for Producing First Monolith and First Monolith Ion Exchanger>

The method for producing the first monolith is not particularly limited, and one example of the production methods, which is in accordance with the method described in Japanese Patent Laid-Open No. 2002-306976, is described below. That is, the first monolith ion exchanger is obtained by mixing the (meth)acrylic acid ester and divinylbenzene as monomers for crosslinking polymerization, a surfactant, water, and, if necessary, a polymerization initiator to obtain a water-in-oil emulsion and subjecting the water-in-oil emulsion to crosslinking polymerization to form the monolith. Such a method for producing the first monolith is preferable in that control of the porous structure of the monolith is easy.

In the production of the first monolith, the content of divinylbenzene in all the monomers to be used for crosslinking polymerization is 0.1 to 10% by mole, and preferably 0.3 to 8% by mole. In addition, in the production of the first monolith, the proportion of the divinylbenzene based on the total amount of the (meth)acrylic acid ester and divinylbenzene is preferably 0.1 to 10% by mole, and particularly preferably 0.3 to 8% by mole.

In the production of the first monolith, the monomers to be used for crosslinking polymerization may be only the (meth)acrylic acid ester and divinylbenzene, or may contain, in addition to the (meth)acrylic acid ester and divinylbenzene, a monomer other than the (meth)acrylic acid ester and divinylbenzene. Examples of the monomer other than the (meth)acrylic acid ester and divinylbenzene include styrene, α-methylstyrene, vinyltoluene, vinylbenzyl chloride, glycidyl (meth)acrylate, 2-ethylhexyl (meth)acrylate, isobutene, butadiene, isoprene, chloroprene, vinyl chloride, vinyl bromide, vinylidene chloride, tetrafluoroethylene, (meth)acrylonitrile, vinyl acetate, ethylene glycol di(meth)acrylate, tripropylene glycol di(meth)acrylate, and trimethylolpropane tri(meth)acrylate. The proportion of the monomer other than the (meth)acrylic acid ester and divinylbenzene in all the monomers to be used for crosslinking polymerization is 0 to 50% by mole, and preferably 0 to 30% by mole.

The surfactant to be used in the production of the first monolith is not particularly limited as long as it can form a water-in-oil (W/O) emulsion when the monomers for crosslinking polymerization and water are mixed, and nonionic surfactants such as sorbitan monooleate, sorbitan monolaurate, sorbitan monopalmitate, sorbitan monostearate, sorbitan trioleate, sorbitan sesquioleate, polyoxyethylene nonyl phenyl ether, polyoxyethylene stearyl ether, polyoxyalkylene lauryl ether, polyoxyethylene sorbitan monooleate, and polyoxyalkylene oleyl cetyl ether; anionic surfactants such as potassium oleate, sodium dodecylbenzenesulfonate, and dioctyl sulfosuccinate sodium salt; cationic surfactants such as cetyl trimethyl ammonium bromide, and distearyl dimethyl ammonium chloride; and amphoteric surfactants such as lauryl dimethyl betaine, can be used. These surfactants can be used singly, or two or more of these surfactants can be used in combination. Note that the water-in-oil emulsion refers to an emulsion in which an oil phase forms a continuous phase, and water droplets are dispersed in the oil phase. The amount of the surfactant to be added can be selected in the range of about 2 to about 70% based on the total amount of the oil-soluble monomers and the surfactant although it cannot generally be said so because the amount of the surfactant to be added varies greatly depending on the types of the oil-soluble monomers and the size of the intended emulsion particles (macropores). In addition, in order to control the shape and size of the bubbles of the monolith, an alcohol such as methanol or stearyl alcohol; a carboxylic acid such as stearic acid; a hydrocarbon such as octane, dodecane, or toluene; or a cyclic ether such as tetrahydrofuran or dioxane is allowed to co-exist in the system although it is not necessarily essential.

In the production of the first monolith, a compound that generates a radical by heat and light irradiation is suitably used as a polymerization initiator which is used as necessary when the monolith is formed by polymerization. The polymerization initiator may be water-soluble or oil-soluble, and examples thereof include azobisisobutyronitrile, azobis(2,4-dimethylvaleronitrile), azobiscyclohexanenitrile, azobis(4-methoxy-2,4-dimethylvaleronitrile), azobiscyclohexanecarbonitrile, azobis(2-methylpropionamidine)dihydrochloride, benzoyl peroxide, potassium persulfate, ammonium persulfate, hydrogen peroxide-ferrous chloride, sodium persulfate-acid sodium sulfite, and tetramethylthiuram disulfide. However, there are systems where polymerization progresses only by heating or only by light irradiation without adding a polymerization initiator according to the circumstances, and therefore the polymerization initiator does not have to be added in such systems.

In the production of the first monolith, the mixing method of mixing the monomers for crosslinking polymerization, the surfactant, water, and the polymerization initiator to form the water-in-oil emulsion is not particularly limited, and a method of mixing each component together at one time, a method of dissolving oil-soluble components composed of an oil-soluble monomer, the surfactant, and an oil-soluble polymerization initiator, and water-soluble components composed of water and a water-soluble polymerization initiator separately and uniformly, and then mixing the respective components, and the like can be used. The mixing apparatus for forming the emulsion is not particularly limited, and a usual mixer, a homogenizer, a high-pressure homogenizer, a so-called planetary stirring apparatus with which substances to be treated are stirred and mixed in such a manner that the substances to be treated are put in a mixing container, and the mixing container is rotated while it is revolved around a revolution axis in an inclined state, and the like can be used, and an appropriate apparatus for obtaining an intended particle diameter of the emulsion may be selected. In addition, the mixing condition is not particularly limited, and the number of revolutions in stirring and the stirring time, under which an intended particle diameter of the emulsion can be obtained, can arbitrarily be set. Among these mixing apparatuses, the planetary stirring apparatus is preferably used because water droplets in a W/O emulsion can uniformly be produced, and the average diameter of the water droplets can arbitrarily be set in a wide range.

As polymerization conditions under which the water-in-oil emulsion thus obtained is polymerized in the production of the first monolith, various conditions can be selected according to the types of monomers and the initiator system. For example, when azobisisobutyronitrile, benzoyl peroxide, potassium persulfate, or the like is used as the polymerization initiator, polymerization by heating may be performed in a sealed container in an inert atmosphere at 30 to 100° C. for 1 to 48 hours, and when hydrogen peroxide-ferrous chloride, sodium persulfate-acid sodium sulfite, or the like is used as the polymerization initiator, polymerization may be performed in a sealed container in an inert atmosphere at 0 to 30° C. for 1 to 48 hours. After the polymerization is completed, the contents are taken out and subjected to soxlet extraction with a solvent, such as isopropanol, to remove unreacted monomers and the residual surfactant, and thus the first monolith is obtained.

The method for producing the first monolith ion exchanger is not particularly limited as long as it is a method by which the first monolith obtained by the method for producing the first monolith can be hydrolyzed to convert the carboxylic acid ester group in the first monolith into the —COOH group and/or the —COONa group.

Examples of the method for hydrolyzing the first monolith include a method of bringing the first monolith into contact with a strong base such as sodium hydroxide, using an aromatic solvent such as toluene or xylene, a halogen solvent such as chloroform or dichloroethane, an ether solvent such as tetrahydrofuran or isopropyl ether, an amide solvent such as dimethylformamide or dimethylacetamide, an alcohol solvent such as methanol or ethanol, a carboxylic acid solvent such as acetic acid or propionic acid, or water as a solvent, and a method of bringing the first monolith into contact with a hydrohalic acid such as hydrochloric acid, a Bronsted acid, such as sulfuric acid, nitric acid, trifluoroacetic acid, methanesulfonic acid, or p-toluenesulfonic acid, or a Lewis acid such as zinc bromide, aluminum chloride, aluminum bromide, titanium(IV) chloride, cerium chloride/sodium iodide, or magnesium iodide.

The monolithic organic porous ion exchanger of the present invention absorbs a large amount of high-concentration aqueous acid solution, particularly high-concentration hydrochloric acid, for example, 0.1 to 37% hydrochloric acid.

In the monolithic organic porous ion exchanger of the present invention, the speed of absorbing the liquid to be absorbed, such as water; a 0.1 to 25% aqueous sodium chloride solution; a 0.1 to 70% aqueous acid solution, for example, 0.1 to 37% hydrochloric acid, aqueous nitric acid solution, or aqueous sulfuric acid solution; a high-concentration alkaline aqueous solution, particularly high-concentration ammonia water, for example, 1 to 30% ammonia water; or a 0.1 to 30% alkaline aqueous solution, for example, a 0.1 to 25% aqueous sodium hydroxide solution, is fast.

In addition, the monolithic organic porous ion exchanger of the present invention has excellent absorbency to a hydrophilic organic solvent including an alcohol such as methanol or ethanol, a ketone such as acetone, an ether such as tetrahydrofuran or dioxane, or dimethylformamide, dimethyl sulfoxide, or the like.

The monolithic organic porous ion exchanger of the present invention is used suitably as an absorbent material for the liquid to be absorbed, such as water, an aqueous solution, or a hydrophilic organic solvent. For example, the monolithic organic porous ion exchanger of the present invention is used suitably as an absorbent material for the liquid to be absorbed, such as water; a 0.1 to 20% aqueous sodium chloride solution; a 0.1 to 70% aqueous acid solution, for example, 0.1 to 37% hydrochloric acid, aqueous nitric acid solution, or aqueous sulfuric acid solution; a high-concentration alkaline aqueous solution, particularly high-concentration ammonia water, for example, 1 to 30% ammonia water; or a 0.1 to 30% alkaline aqueous solution, for example, a 0.1 to 20% sodium hydroxide aqueous solution. In addition, the monolithic organic porous ion exchanger of the present invention is used suitably as an absorbent material for a hydrophilic organic solvent including an alcohol such as methanol or ethanol, a ketone such as acetone, an ether such as tetrahydrofuran or dioxane, or dimethylformamide, dimethyl sulfoxide, or the like.

Next, the present invention will specifically be described by Examples, but these are only exemplary and do not limit the present invention.

EXAMPLES

Example 1

(Production of First Monolith)

Mixed and uniformly dissolved were 9.2 g of t-butyl methacrylate, 0.28 g of divinylbenzene, 1.0 g of sorbitan monooleate (hereinafter, abbreviated as SMO), and 0.4 g of 2,2'-azobis(isobutyronitrile). Next, the t-butyl methacrylate/divinylbenzene/SMO/2,2'-azobis(isobutyronitrile) mixture was added to 180 g of pure water and stirred under reduced pressure using a vacuum mixing-degassing mixer (manufactured by EME Corporation), which is a planetary stirring apparatus, to obtain a water-in-oil emulsion. This emulsion was transferred quickly to a reaction container and polymerized at 60° C. for 24 hours after sealing the reaction container, while the emulsion was left to stand still. After the polymerization was completed, the contents were taken out and subjected to extraction with methanol, and the extract was dried under reduced pressure to produce a monolith A having a continuous macropore structure. The internal structure of the first monolith A thus obtained was observed with SEM (FIG. 1). As a result, the first monolith A had an open-cell structure, and the thickness of the continuous skeleton was 5.4 μm. The average diameter measured by mercury porosimetry was 36.2 μm, and the total pore volume was 15.5 mL/g.

(Production of First Monolith Ion Exchanger)

The first monolith A produced by the above-described method was immersed in dichloroethane containing zinc bromide and stirred at 40° C. for 24 h, and then brought into contact with methanol, 4% hydrochloric acid, a 4% aqueous sodium hydroxide solution, and water in the mentioned order to perform hydrolysis to obtain the first monolith ion exchanger A.

The obtained first monolith cation exchanger A had an ion-exchange capacity of 10.4 mg equivalent/g in a dry state, so that it was ascertained that the carboxyl group was introduced. In addition, the average diameter of the three dimensionally continuous pores of the monolith cation exchanger A in a dry state and the total pore volume of the monolith cation exchanger A in a dry state, which were determined from measurement by mercury porosimetry, were 49.1 μm and 13.5 mL/g, respectively. The thickness of the continuous skeleton, which was obtained by SEM observation, was 9.5 μm.

Figure 2:
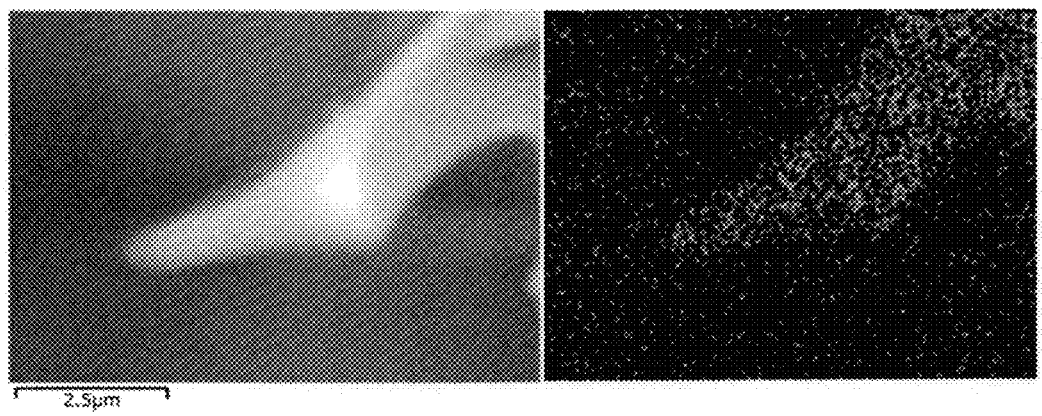
FIG. 2 shows a SEM photograph and a result of EPMA analysis of a monolithic organic porous ion exchanger of Example 1.

Subsequently, the distribution state of sodium was observed with EPMA (FIG. 2) in order to check the distribution state of the carboxyl groups in the first monolith ion exchanger A. Note that, in FIG. 2, the left figure shows a SEM photograph of a fracture surface, and the right figure shows mapping of Na distribution at the same part as in the left figure. The distribution state of the carboxyl groups on the section of the skeleton was such that the carboxyl groups were distributed uniformly not only on the surface of the skeleton of the monolith cation exchanger but also inside the skeleton, so that it was able to be ascertained that the carboxyl groups were introduced uniformly in the monolith ion exchanger.

Figure 3:
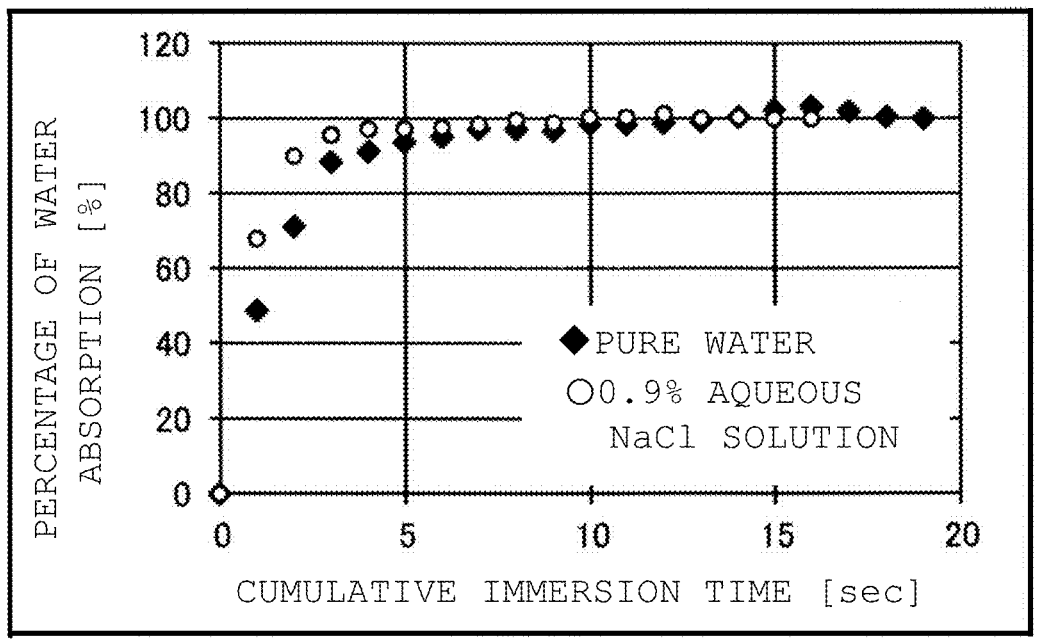
FIG. 3 shows water absorption speed test results for a monolithic organic porous ion exchanger of Example 1.

Subsequently, water absorption speed tests for the first monolith ion exchanger A were conducted. The water absorption speed tests were conducted using pure water and a 0.9% aqueous sodium chloride solution as liquids to be absorbed, and as a result, the immersion time until the absorption amount reached 90% of the saturated absorption amount was within 5 seconds for both of the liquids to be absorbed (FIG. 3). Further, water absorption tests for the first monolith ion exchanger A were conducted using a 0.9% aqueous sodium chloride solution, a 4% aqueous NaOH solution, 35% hydrochloric acid, and 29% ammonia water as test water. As a result, the water absorption for the 0.9% aqueous sodium chloride solution was 67 g/g-resin, the water absorption for the 4% aqueous NaOH solution was 78 g/g-resin, the water absorption for 35% hydrochloric acid was 28 g/g-resin, and the water absorption for 29% ammonia water was 105 g/g-resin.

<Evaluation of Water Absorbency>

(Water Absorption Speed Testing Method)

A tube the one end of which was sealed with a nonwoven fabric in order to hold the ion exchanger, the tube having a length of 100 mm and an inner diameter of 10 mm, was prepared, and the ion changer in a dry state was put therein to make a sample tube. The weight of the tube before and after putting the ion exchanger was measured to calculate the weight of the ion exchanger in the tube. Next, after the non-woven fabric side of the sample tube was immersed in the liquid to be absorbed, the concentration of which was known, for a predetermined time, the tube was pulled up from the solution and held for 1 minute to measure the weight of the tube, and the immersion and the measurement were repeated until the weight was not changed. The absorption at the time when the weight was not changed was defined as the saturated absorption.

(Water Absorption Testing Method)

The water absorption test was conducted in accordance with the method of JIS. The ion exchanger was put in a tea bag to make a sample, and after the sample was immersed in the liquid to be absorbed for 24 hours, the absorption of the liquid to be absorbed was determined from the weight before and after the absorption.

Comparative Example 1

Figure 4:
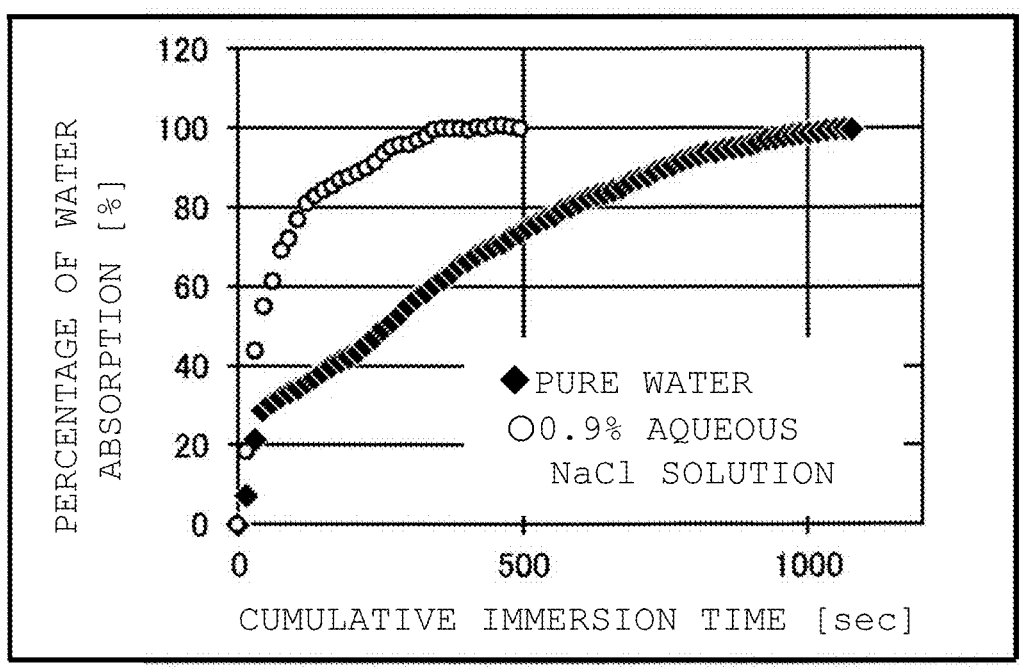
FIG. 4 shows water absorption speed test results for a monolithic organic porous ion exchanger of Comparative Example 1.

The water absorption test and the water absorption test were conducted using a superabsorbent polymer, trade name: Superabsorbent Polymer (acrylic acid salt), manufactured by FUJIFILM Wako Pure Chemical Corporation. As a result, in the water absorption speed test, the immersion time of 12 minutes was needed in pure water until the absorption reached 90% based on the saturated absorption, and the immersion time of 3.5 minutes was needed in the 0.9% aqueous sodium chloride solution until the absorption reached 90% based on the saturated absorption (FIG. 4). Further, the water absorption for the 0.9% aqueous sodium chloride solution was 52 g/g-resin, the water absorption for the 4% aqueous NaOH solution was unmeasurable because the superabsorbent polymer dissolved during the immersion, the water absorption for 35% hydrochloric acid was 2 g/g-resin, and the water absorption for 29% ammonia water was 128 g/g-resin.

Example 2

A first monolith ion exchanger B was obtained in the same manner as in Example 1, except that 9.2 g of t-butyl methacrylate was changed to 6.4 g of t-butyl methacrylate and 2.8 g of 2-ethylhexyl methacrylate. The first monolith ion exchanger B in a dry state had an ion-exchange capacity of 5.0 mg equivalent/g.

Figure 5:
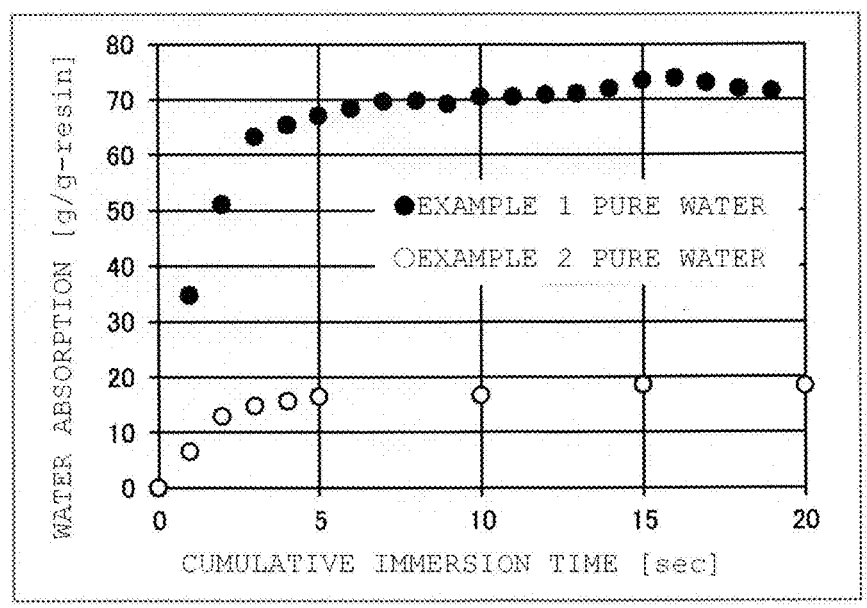
FIG. 5 is a graph showing relation between water absorption and cumulative immersion time when an object to be absorbed is pure water for Example 1 and Example 2.

Subsequently, the water absorption speed test was conducted in the same manner as in Example 1 for the obtained first monolith ion exchanger B using pure water as a liquid to be absorbed. The saturated absorption was 18 g/g-resin, the immersion time was within 5 seconds until the absorption reached 90% of the saturated absorption (FIG. 5). Note that FIG. 5 shows relation between water absorption and cumulative immersion time when the liquid to be absorbed is pure water for Example 1 and Example 2.

The invention claimed is:

1. An absorbent material for a liquid to be absorbed, being monolithic organic porous ion exchanger comprising:
   a continuous skeleton; and
   continuous pores, wherein
   the continuous skeleton is formed of an organic polymer being a hydrolysate of a crosslinked polymer of a (meth)acrylic acid ester and a polymerization monomer, the organic polymer having any one or both of a —COOH group and a —COONa group as ion-exchange groups,
   the polymerization monomer is divinylbenzene or divinylbenzene and at least one of ethylene glycol di(meth)acrylate, tripropylene glycol di(meth)acrylate and trimethylolpropane tri(meth)acrylate,
   the organic polymer comprises:
      a constituent unit A: a polymerization residue of an ethylene group, and
      a constituent unit B: a crosslinking polymerization residue of divinylbenzene, or
      a constituent unit A: a polymerization residue of an ethylene group,
      a constituent unit B: a crosslinking polymerization residue of divinylbenzene, and
      at least one polymerization residue of ethylene glycol di(meth)acrylate, tripropylene glycol di(meth)acrylate and trimethylolpropane tri(meth)acrylate,
   in the organic polymer, a proportion of the constituent unit B is 0.1 to 30% by mole based on a total amount of the constituent units, a proportion of the constituent unit B based on a total number of moles of the constituent unit A and the constituent unit B is 0.1 to 30% by mole, and a proportion of the at least one polymerization residue of ethylene glycol di(meth)acrylate, tripropylene glycol di(meth)acrylate and trimethylolpropane tri(meth)acrylate is 0 to 80% by mole based on a total amount of the constituent units,
   the continuous skeleton has a thickness of 0.1 to 100 µm, the continuous pores have an average diameter of 1.0 to 1000 µm, the monolithic organic porous ion exchanger has a total pore volume of 0.5 to 50.0 mL/g, and
   the monolithic organic porous ion exchanger has a total ion-exchange capacity of the —COOH group and the —COONa group per weight in a dry state of 4.0 mg equivalent/g or more.

2. The absorbent material for a liquid to be absorbed according to claim 1, wherein
   in the organic polymer, a proportion of the constituent unit B is 0.1 to 10% by mole based on a total amount of the constituent units, and a proportion of the constituent unit B based on a total number of moles of the constituent unit A and the constituent unit B is 0.1 to 10% by mole, and the absorbent material for a liquid to be absorbed has an open-cell structure in which bubble-like macropores overlap and overlapping parts form openings having an average diameter of 1.0 to 1000 μm, and has a total pore volume of 1.0 to 50.0 mL/g.

\* \* \* \* \*